(12) United States Patent
Jurkiewicz (10) Patent No.: US 8,777,251 B2
(45) Date of Patent: Jul. 15, 2014

(54) WHEELCHAIR AND CONTROLLER (75) Inventor: Damon Jurkiewicz, Cleveland, OH (US)

(73) Assignee: Invacare Corporation, Elyria, OH (US)

( * ) Notice: Subject to any disclaimer, the term of this patent is extended or adjusted under 35 U.S.C. 154(b) by 3 days.

(21) Appl. No.: 13/583,103

(22) PCT Filed: Mar. 16, 2011

(86) PCT No.: PCT/US2011/028610
§ 371 (c)(1),
(2), (4) Date: Sep. 6, 2012

(87) PCT Pub. No.: WO2011/116053
PCT Pub. Date: Sep. 22, 2011

(65) Prior Publication Data
US 2012/0325575 A1 Dec. 27, 2012

Related U.S. Application Data (60) Provisional application No. 61/314,319, filed on Mar. 16, 2010.

(51) Int. Cl.
*B62D 61/00* (2006.01)
*A61G 5/02* (2006.01)
*A61G 5/10* (2006.01)

(52) U.S. Cl.
CPC .......... *A61G 5/024* (2013.01); *A61G 2005/1051* (2013.01); *Y10S 180/907* (2013.01)
USPC .......................... 280/304.1; 180/333; 180/907

(58) Field of Classification Search
CPC ............... A61G 2005/048; A61G 2005/1051; A61G 5/024

USPC ....................... 280/304.1; 180/315, 333, 907; 74/471 XY
See application file for complete search history.

(56) References Cited

U.S. PATENT DOCUMENTS

| 4,037,676 A | * | 7/1977 | Ruse .............................. 180/6.5 |
| 5,137,102 A | * | 8/1992 | Houston et al. ........... 180/65.51 |
| 5,382,036 A | * | 1/1995 | Counts et al. .............. 280/250.1 |
| 5,491,462 A | * | 2/1996 | Cecchi et al. ................. 338/128 |
| 5,495,904 A | * | 3/1996 | Zwaan et al. ................... 180/11 |
| 6,375,209 B1 | * | 4/2002 | Schlangen ................. 280/250.1 |
| 7,003,381 B2 | * | 2/2006 | Wakefield, II .................... 701/1 |
| 7,165,276 B2 | * | 1/2007 | Hahn et al. ................ 5/81.1 RP |
| 7,171,288 B2 | * | 1/2007 | Wakefield, II ................... 701/1 |
| 7,341,123 B2 | * | 3/2008 | Brendel et al. ............ 180/65.51 |
| 7,427,078 B1 | * | 9/2008 | Humble et al. ........... 280/304.1 |
| 2005/0075758 A1 | * | 4/2005 | Wakefield ......................... 701/1 |
| 2005/0076436 A1 | * | 4/2005 | Hahn et al. ................... 5/81.1 R |
| 2005/0080518 A1 | * | 4/2005 | Wakefield ......................... 701/1 |
| 2008/0041282 A1 | * | 2/2008 | Goschy et al. ................ 108/141 |
| 2011/0127748 A1 | * | 6/2011 | Rousseau .................. 280/250.1 |

* cited by examiner

*Primary Examiner* — James English
(74) *Attorney, Agent, or Firm* — Calfee, Halter & Griswold LLP (57) ABSTRACT

In one embodiment, the present invention is directed to a controller for a wheelchair. The controller includes a joystick for controlling the speed and direction of the wheelchair. A housing of the controller has a top surface and a bottom surface. The top surface has a weight bearing portion configured to support a user's weight when the user places at least a portion of his or her hand on the weight bearing portion to facilitate entering or exiting the wheelchair.

32 Claims, 6 Drawing Sheets

WHEELCHAIR AND CONTROLLER

CROSS REFERENCE TO RELATED APPLICATION

This case claims priority to, and any other benefit of, U.S. Provisional Patent Application Ser. No. 61/314,319, filed on Mar. 16, 2010 and entitled WHEELCHAIR AND CONTROLLER, which is hereby incorporated by reference in its entirety.

BACKGROUND

It is well known that physically impaired individuals with such disabilities as spinal cord injury, muscular dystrophy, multiple sclerosis, cerebral palsy or arthritis need the assistance of a power driven wheelchair to be mobile. Power driven wheelchairs, which may be of the type manufactured by Invacare Corporation of Elyria, Ohio, for example, generally include right and left side drive wheels driven by a motor controller via respectively corresponding right and left side drive motors, all of which are disposed on the wheelchair. A user can control, for example, the speed and direction of movement of the wheelchair, by manipulating a controller. A joystick is one common type of controller used with power driven wheelchairs.

SUMMARY

In one embodiment, the present invention is directed to a controller for a wheelchair. The controller includes a joystick for controlling the speed and direction of the wheelchair. A housing of the controller has a top surface and a bottom surface. The top surface has a weight bearing portion configured to support a user's weight when the user places at least a portion of his or her hand on the weight bearing portion to facilitate entering or exiting the wheelchair.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of this invention.

DESCRIPTION OF EMBODIMENTS

As described herein, when one or more components are described as being connected, joined, affixed, coupled, attached, or otherwise interconnected, such interconnection may be direct as between the components or may be in direct such as through the use of one or more intermediary components. Also as described herein, reference to a "member," "component," or "portion" shall not be limited to a single structural member, component, or element but can include an assembly of components, members or elements. Further, references herein to surfaces, portions, areas, and the like is not limited to single, homogenous or unitary-type structures and can include a plurality of structures configured or combined to form the described feature.

In one embodiment, the present invention is directed to a conveyance such as a wheelchair that includes a seat assembly, chassis, controller, and a drive system. The controller has user inputs to control the drive system that propels the conveyance. The drive system includes, for example, one or more drive wheels, a drive assembly, and an energy source. The drive assembly may be any one of a plurality of assemblies including, for example, wheel hub motors, motor and gearbox combinations, or any other suitable drive assembly.

In one embodiment, the controller is a joystick type controller having a joystick for speed and direction input and a housing and other components that function as a structural extension of the seat assembly to allow for weight-bearing capability thereon. In this embodiment, the controller can include a structural arm connected to, for example, an arm rest of the seat assembly or may be integrally formed into the arm rest. Any weight applied to the controller is then structurally transferred to the chair assembly. Situations that include weight bearing down on the controller include when a user places the palm of his or her hand on the controller as a support when entering or exiting the conveyance.

The housing of the controller may include several portions. For example, in one embodiment, the controller includes a rearward portion having an angled surface to provide placement for auxiliary controls, including, for example, on/off, speed, and horn functions. The rear angled surface rises up to a top surface. A central portion of the top surface includes an opening for accommodating the joystick. Forward of the central portion of the top surface has an area or section adapted for at least partly supporting a user's weight when, for example, the user places his or her hand thereon to facilitate getting in and out of the conveyance. This area or section may, in one embodiment, be clear of controller components such as buttons, switches, displays, and other devices susceptible to damage by a user using this area to facilitate at least partly supporting his or her weight when entering or leaving the conveyance. In other embodiments, controller components may be included in this area provided they are capable of acting as weight-being members without resulting in damage thereto.

Figure 1:
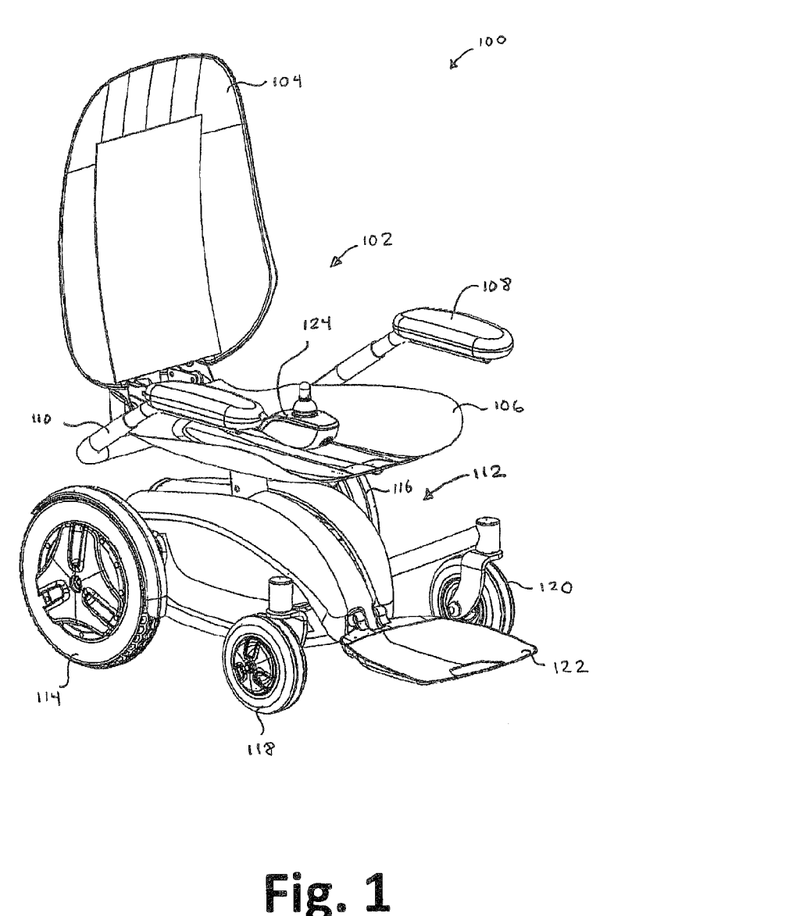
FIG. 1 is a perspective view of one embodiment of a conveyance incorporating aspects of the present invention.

Referring to FIG. 1, a conveyance such as a wheelchair 100 is illustrated. Wheelchair 100 includes a seat assembly 102 and a chassis 112. Seat assembly 102 includes a back portion 104, a seat portion 106, and armrests assemblies 108 and 110. Back portion 104 and seat portion 106 are constructed in such a manner so as to allow the angle there between to be adjusted and to also allow for folding of these components together to facilitate disassembly and transportation of wheelchair 100.

Drive wheels 114 and 116 are connected to chassis 112 for propulsion of wheelchair 100. Drive wheels 114 and 116 may be driven by a plurality of types of drive assemblies including, for example, electric motor and gear combinations or gearless brushless motors such as wheel hub motors. Casters 118 and 120 are also connected to chassis 112 for providing forward support of wheelchair 100. A footplate 122 is connected to the front portion of chassis 112 to support the feet of a user. A controller 124 is also provided to allow a user to control the drive system of wheelchair 100.

Figure 2:
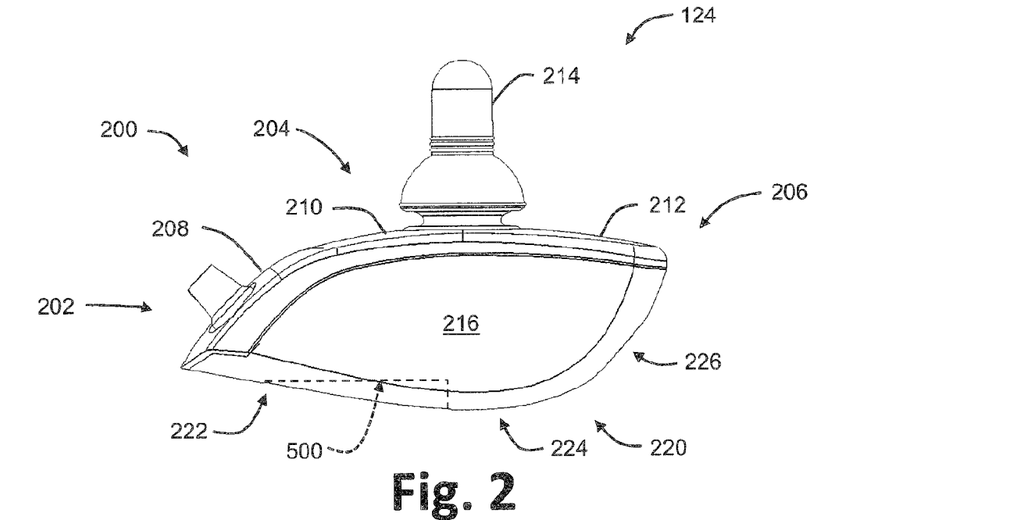
FIG. 2 is a side elevational view of one embodiment of a controller of the present invention.

Illustrated in FIG. 2 is a side elevational view of controller 124. Controller 124 includes a housing 200 having a rear portion 202, central portion 204, and front portion 206. Rear portion 202 includes an angled surface 208. Central portion 204 includes a top surface 210 area or section 212. In the present embodiment, angled surface 208 smoothly transitions to top surface 210. However, in other embodiments, the transition may be either smooth or abrupt including one or more intermediate surfaces as part of the transition. The joystick 214 protrudes from top surface 210 allowing a user of the conveyance to control the speed and direction of the conveyance by moving the joystick 214.

Housing 200 also includes a bottom surface 220 having a rear portion 222, central portion 224, and front portion 226. In the present embodiment, the rear, central, and front portions smoothly transition into each other. Rear portion 222 extends downwardly toward central portion 224, which then extends upwardly to front portion 226. Front portion 226 further extends upwardly to area or section 212 of top surface 210.

Figure 3:
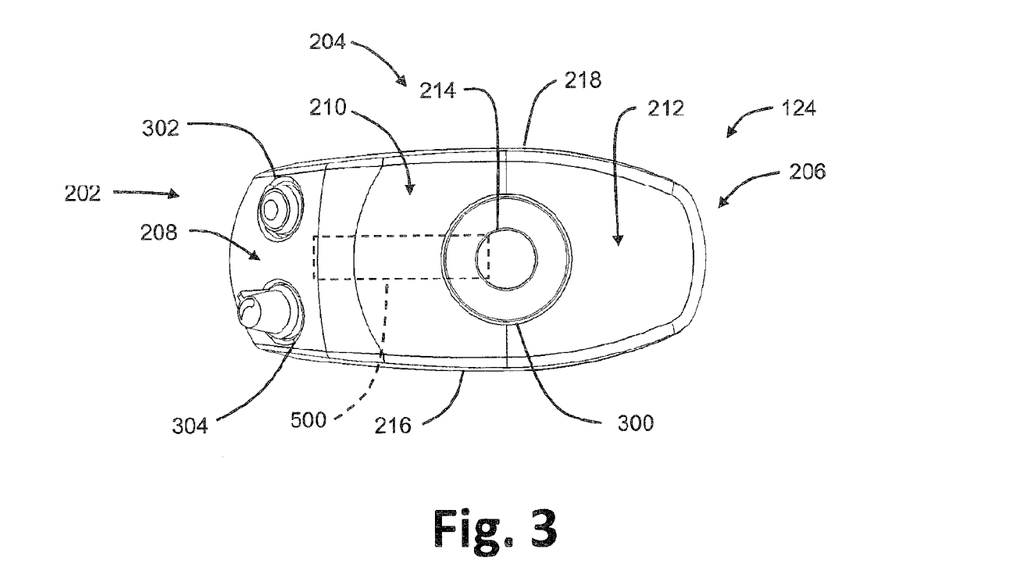
FIG. 3 is a top view of one embodiment of a controller of the present invention.

Referring now to FIG. 3, a top view of controller 124 is shown. Housing 200 further includes side surfaces 216 and 218 that extend between the top and bottom of the housing. Joystick 214 is positioned proximate a central portion of the top surface 210 substantially equidistant from side surfaces 216 and 218 and from the lateral extremities of top surface 210. In other embodiments, joystick 214 need not be placed proximate a central portion but maybe offset either laterally and/or longitudinally therefrom.

Area 212 is disposed forward of joystick 214 and proximate forward portion 206 of controller 124. Area 212 extends from aperture 300 to side frames 216 and 218 to forward portion 206. Area 212 is substantially planar but can include slightly non-planar geometry as well.

Housing 200 further includes apertures 302 and 304 for auxiliary devices including, for example, on/off switches, speed control dials, horns, buttons, displays, and other devices. Apertures 302 and 304 are disposed in rear surface 208, which is proximate the user when seated in the conveyance. Additionally, apertures in addition to 302 and 304 may be provided in rear surface 208 and may be disposed in any geometric pattern relative to each other.

Figure 4:
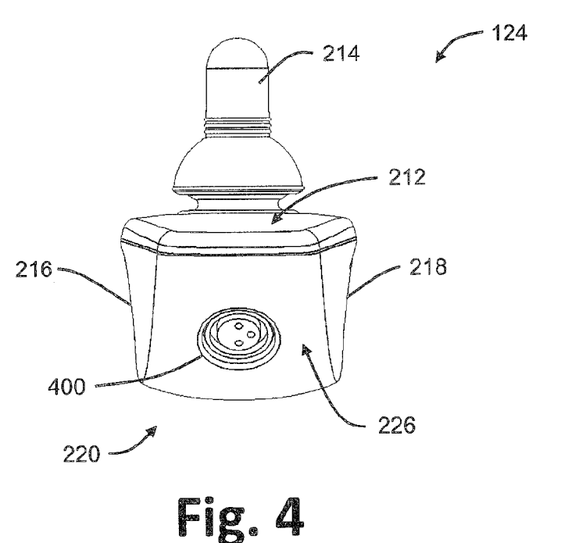
FIG. 4 is a front elevational view of one embodiment of a controller of the present invention.

FIG. 4 illustrates a front elevational view of controller 124. As shown therein, the front portion 226 of bottom surface 220 includes aperture 400. In the present embodiment, aperture 400 provides access to a charging port for charging the energy source of conveyance 100. In other embodiments, aperture 400 may provide, either in addition to or in lieu of access to a charging port, a communications port and/or a memory port. Also, apertures in addition to 400 may be provided for these purposes.

Figure 5:
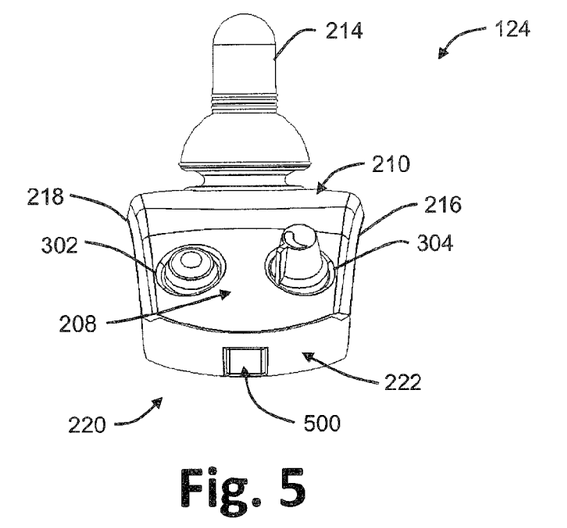
FIG. 5 is a rear elevational view of one embodiment of a controller of the present invention.
Figure 6:
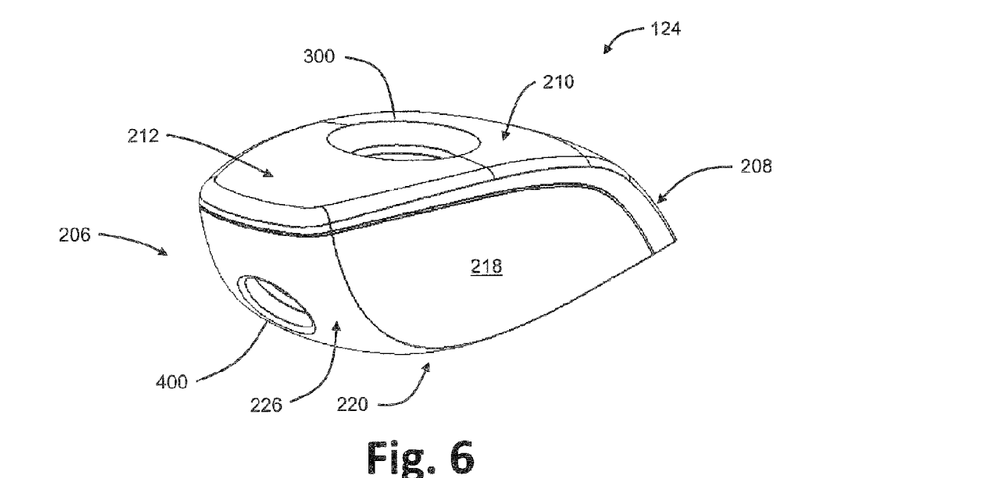
FIGS. 6 and 7 are perspective views of one embodiment of a controller housing of the present invention.
Figure 7:
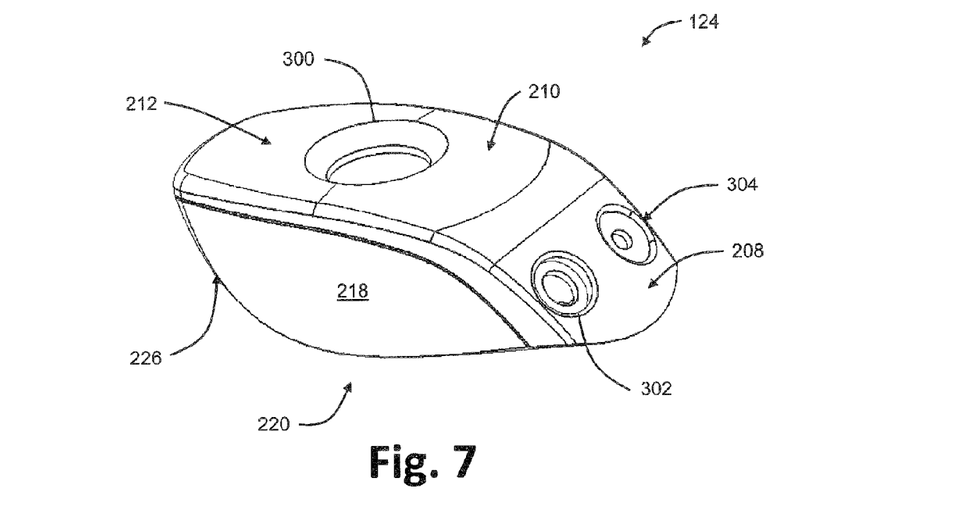

FIG. 5 illustrates a rear elevational view of controller 124. Bottom surface 220 includes a mounting recess 500. In the embodiment shown, mounting recess 500 is configured to accept a mounting bracket or similar type structure for mounting or attaching controller 124 to conveyance 100. As shown in FIG. 2, mounting recess 500 extends longitudinally into bottom surface 220 proximate its central portion 224 and rear portion 222. In other embodiments, a mounting recess need not be provided and mounting of controller 124 can be accomplished by mounting directly to any housing surface or surfaces. FIGS. 6 and 7 illustrate perspective views of controller 124 housing 200 but absent joystick 214 and auxiliary input devices.

Figure 8:
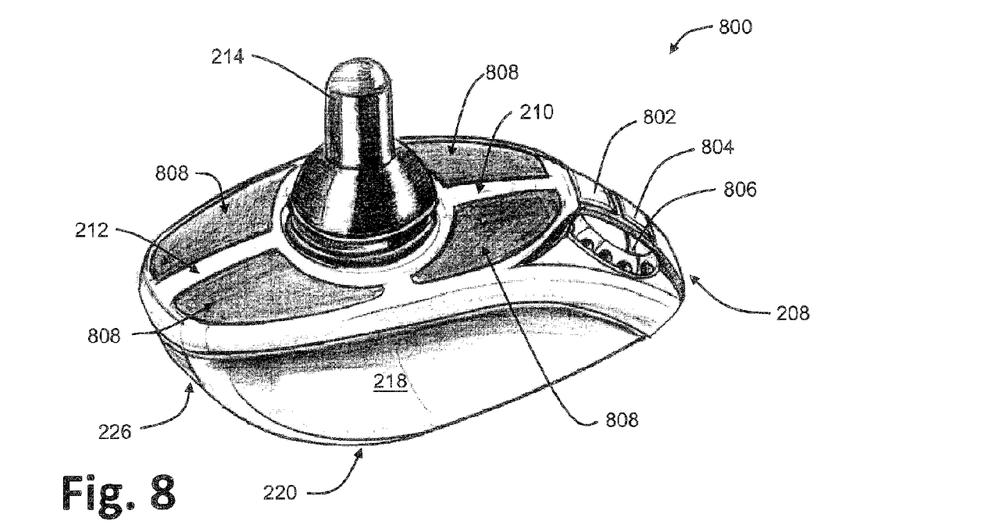
FIGS. 8 and 9 are perspective views of another embodiment of a controller of the present invention.
Figure 9:
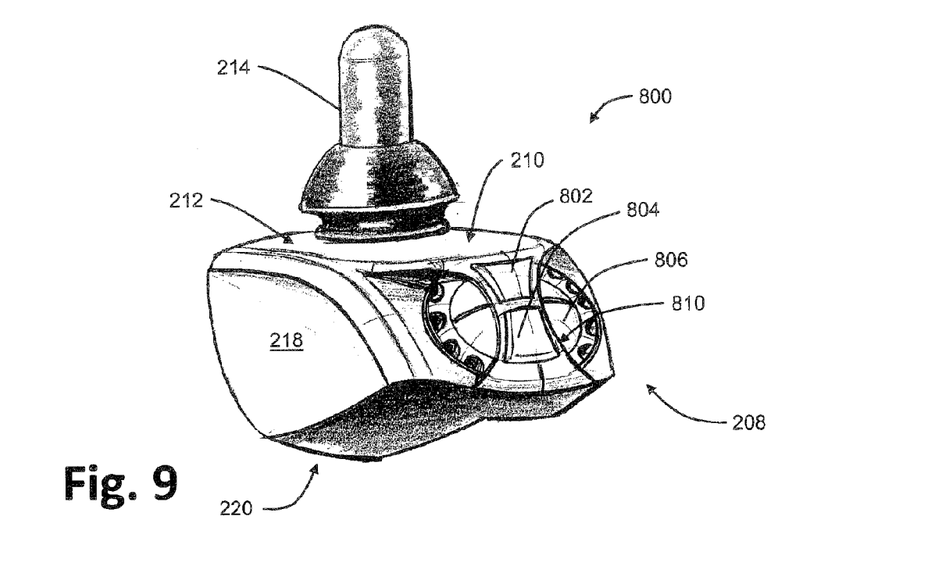

FIGS. 8 and 9 illustrate another embodiment of a controller 800 of the present invention. Controller 800 includes a housing similar to that of FIGS. 1-7, except that rear surface 208 includes another embodiment of auxiliary devices. The auxiliary devices include control buttons 802 and 804 and rotary dial 806. Control buttons 802 and 804 are disposed on a vertically oriented bridge member 810. Bridge member 810 extends from a lower portion of rear surface 208 to a an upper portion of rear surface 208. In other embodiments, bridge member 810 can have a horizontal or other orientation. Rotary dial 806 is disposed under bridge member 810 thereby having freedom to rotate clockwise or counterclockwise to facilitate adjust of, for example, the speed of the conveyance.

Controller 800 of FIGS. 8 and 9 provides housing where the only protruding component is joystick 214. Auxiliary devices 802, 804, and 806 are disposed so as to either not protrude or very minimally protrude from the housing thereby eliminating or minimizing inadvertent actuation of these devices by the sleeve or cuff of a user's shirt, coat or jacket.

As configured in the illustrated embodiments, area 212 of controller 124 is figured to allow a user to place his or her hands on that portion in order to at least partly support themselves when entering or exiting the conveyance. Area 212 may be free from instrumentation such as displays, buttons, dials, switches, etc. which may be susceptible to damage under these conditions. In other embodiment, area 212 may include instrumentation that is capable of bearing weight such as recessed, flush or surface mount instrumentation. Still further, sensor or other devices can be used to disable some or all instrumentation controls when area 212 detects a weight-bearing condition.

The size of area 212 is configured to facilitate the palm region of a user's hand. Area 212 may further be configured to include surface features (e.g., 808) that facilitate non-slippage between a user's hand and controller 124 should the controller be used as a means of assistance. The surface features may include ribs, bumps, dimples, roughing, overlaying materials (e.g., foam, leather, rubber and the like), etc. Also, front portion 226 is configured to approximate the curvature of the fingers of a user's hand to facilitate secure gripping of controller 124 should it be used as a means of assistance by a user when entering or exiting of the conveyance.

In one embodiment, the controller can be connected to, for example, an arm rest of the seat assembly or may be integrally formed into the arm rest. As such, any force applied to the controller is structurally transferred to the chair assembly. For example, forces applied to area 212 of the controller are transferred to the arm rest of the seat assembly through the side frames 216 and 218 and bottom surface 220 of the controller. Situations that include force applied to the controller include when a user places the palm of his or her hand on the controller as a support when entering or exiting the conveyance.

The housing of the controller may be made of a variety of materials (e.g., plastic, metal, carbon-fiber, etc.). For example, the housing of the controller may be made of polycarbonate ABS or glass reinforced nylon. These materials are tough and durable with strength and impact resistant properties that permit area 212 of top surface 210 to support a user's weight when the user places at least a portion of his or her hand on area 212 to facilitate entering or exiting the conveyance.

Figure 10:
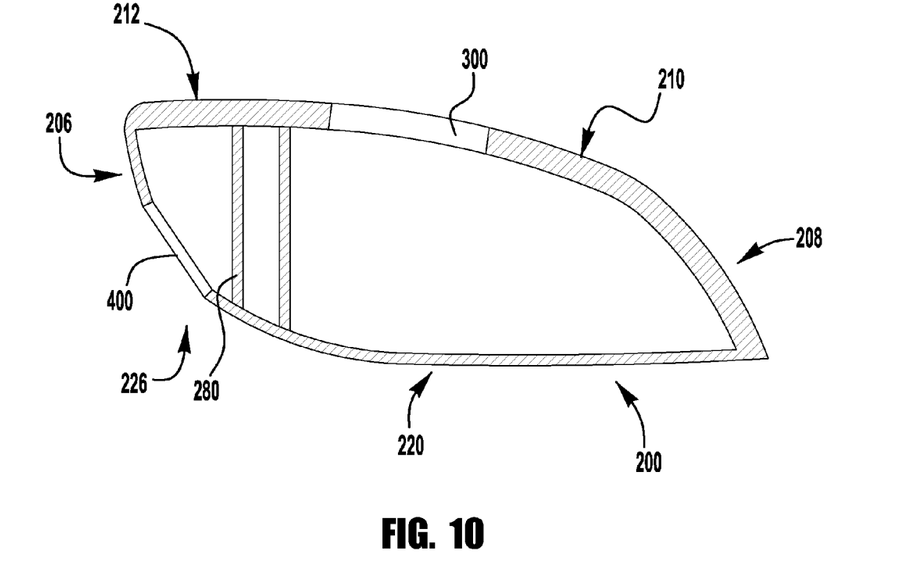
FIG. 10 is a side cross sectional view of the controller housing shown in FIGS. 6 and 7.

Further, as shown in FIG. 10, the housing of the controller may include interior ribs 280 configured to support area 212 of top surface 210. These ribs 280 provide reinforcement to area 212 of top surface 210 that permits the area to support a user's weight when the user places at least a portion of his or her hand on area 212 to facilitate entering or exiting the conveyance. In lieu of or in addition to the ribs, one or more areas of the housing may have of an increased wall thickness for added strength. For example, as shown in FIG. 10, the wall thickness of the weight bearing portions of the controller may be increased to support a user's weight when the user places at least a portion of his or her hand on area 212 to facilitate entering or exiting the conveyance. In one embodiment, the housing of the controller is formed from one or more sections (e.g., a top and bottom). The mold line or joint between these sections may be configured such as to permit the controller to function as a weight bearing component. For example, the mold line or joint may be reinforced such that the sections of the housing do not separate when the user places at least a portion of his or her hand on area 212 to facilitate entering or exiting the conveyance.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. For example, the controller housing can have any shape geometry so long as it is consistent with the functions described herein. Still further, joystick and auxiliary devices can be located anywhere on controller 124 so long as they too facilitate the functions described herein. Therefore, the invention, in its broader aspects, is not limited to the specific details, the representative apparatus, and illustrative examples shown and described. Accordingly, departures can be made from such details without departing from the spirit or scope of the applicant's general inventive concept.

I claim:

1. A wheelchair, comprising:
a chassis;
a seat assembly connected to the chassis;
a drive system for propelling the wheelchair, the drive system including one or more drive wheels connected to the chassis, the drive wheels driven by one or more drive assemblies;
a controller having one or more user inputs for controlling the drive system, the controller including a housing having a top surface and a bottom surface, the top surface having a weight bearing portion configured to support a user's weight when the user places at least a portion of his or her hand on the weight bearing portion without damaging the controller to facilitate entering or exiting the wheelchair; and
wherein the wall thickness of the weight bearing portion is greater than the wall thickness of at least one other portion of the housing such that the weight bearing portion supports the user's weight when the user places at least a portion of his or her hand on the weight bearing portion without damaging the controller to facilitate entering or exiting the wheelchair.

2. The wheelchair of claim 1, wherein the size of the weight bearing portion is configured to facilitate the palm region of the user's hand.

3. The wheelchair of claim 1, wherein the weight bearing portion is substantially planar.

4. The wheelchair of claim 1, wherein the weight bearing portion comprises surface features that facilitate non-slippage between the user's hand and the controller.

5. The wheelchair of claim 1, wherein the weight bearing portion is free of instrumentation that is susceptible to damage when the user places at least a portion of his or her hand on the weight bearing portion to facilitate entering or exiting the wheelchair.

6. The wheelchair of claim 1, wherein the one or more user inputs includes a joystick configured to permit the user to control the speed and direction of the wheelchair by moving the joystick.

7. The wheelchair of claim 6, wherein a central portion of the top surface comprises an opening for the joystick and the joystick protrudes from the central portion of the top surface.

8. The wheelchair of claim 7, wherein the weight bearing portion is disposed forward of the joystick and proximate a forward portion of the housing.

9. The wheelchair of claim 1, wherein the bottom surface includes a front portion that extends upwards to the weight bearing portion of the top surface, the front portion configured to approximate the curvature of the fingers of the user's hand to facilitate gripping of the controller.

10. The wheelchair of claim 9, wherein the front portion of the bottom surface includes an aperture that provides access to a charging port for charging an energy source of the wheelchair.

11. The wheelchair of claim 1, wherein the controller is mounted to an arm rest of the seat assembly such that the user's weight applied to the controller is transferred to the seat assembly.

12. The wheelchair of claim 11, wherein the bottom surface of the controller includes a mounting recess for mounting the controller to the arm rest.

13. The wheelchair of claim 1, wherein the controller includes a rearward portion having an angled surface that rises up to the top surface.

14. The wheelchair of claim 13, wherein the angled surface includes one or more apertures disposed therein for placement of one or more auxiliary controls.

15. The wheelchair of claim 13, wherein the angled surface includes one or more control buttons disposed on a bridge member.

16. The wheelchair of claim 13, wherein the angled surface includes a rotary dial.

17. The wheelchair of claim 1 further comprising interior ribs configured to reinforce the weight bearing portion such that the weight bearing portion supports the user's weight when the user places at least a portion of his or her hand on the weight bearing portion without damaging the controller to facilitate entering or exiting the wheelchair.

18. A controller for a wheelchair, comprising:
a joystick for controlling the speed and direction of the wheelchair;
a housing having a top surface and a bottom surface, the top surface having a substantially planar weight bearing portion configured to support a user's weight when the user places at least a portion of his or her hand on the weight bearing portion without damaging the controller to facilitate entering or exiting the wheelchair, and wherein the weight bearing portion is disposed forward of the joystick and proximate a forward portion of the housing; and
wherein the wall thickness of the weight bearing portion is greater than the wall thickness of at least one other portion of the housing such that the weight bearing portion supports the user's weight when the user places at least a portion of his or her hand on the weight bearing portion without damaging the controller to facilitate entering or exiting the wheelchair.

19. The controller of claim 18, wherein the size of the weight bearing portion is configured to facilitate the palm region of the user's hand.

20. The controller of claim 18, wherein the bottom surface includes a front portion that extends upwards to the weight bearing portion of the top surface, the front portion configured to approximate the curvature of the fingers of the user's hand to facilitate gripping of the controller.

21. The controller of claim 20, wherein the front portion of the bottom surface includes an aperture that provides access to a charging port for charging an energy source of the wheelchair.

22. The controller of claim 18, wherein a central portion of the top surface comprises an opening for the joystick and the joystick protrudes from the central portion of the top surface.

23. The controller of claim 18, wherein the weight bearing portion comprises surface features that facilitate non-slippage between the user's hand and the controller.

24. The controller of claim 18, wherein the weight bearing portion is free of instrumentation that is susceptible to damage when the user places at least a portion of his or her hand on the weight bearing portion to facilitate entering or exiting the wheelchair.

25. The controller of claim 18 further comprising a rear angled surface that rises up to the top surface.

26. The controller of claim 25, wherein the rear angled surface includes one or more apertures disposed therein for placement of one or more auxiliary controls.

27. The controller of claim 25, wherein the rear angled surface includes one or more control buttons disposed on a bridge member.

28. The controller of claim 25, wherein the rear angled surface includes a rotary dial.

29. The controller of claim 18, wherein the housing is made of polycarbonate ABS plastic.

30. The controller of claim 18 further comprising interior ribs configured to reinforce the weight bearing portion such that the weight bearing portion supports the user's weight when the user places at least a portion of his or her hand on the weight bearing portion without damaging the controller to facilitate entering or exiting the wheelchair.

31. A controller for a wheelchair, comprising:
a joystick for controlling the speed and direction of the wheelchair;
a top surface having a central portion and a weight bearing portion, wherein the joystick protrudes from the central portion, and wherein the weight bearing portion is configured to support a user's weight when the user places at least a portion of his or her hand on the weight bearing portion without damaging the controller to facilitate entering or exiting the wheelchair, and wherein the weight bearing portion is disposed forward of the joystick and proximate a forward portion of the controller, and wherein the size of the weight bearing portion is configured to facilitate the palm region of the user's hand;
a rear angled surface that rises up to the central portion of the top surface;
a bottom surface having a front portion that extends upwards to the weight bearing portion of the top surface, the front portion configured to approximate the curvature of the fingers of the user's hand to facilitate gripping of the controller; and
wherein the wall thickness of the weight bearing portion is greater than the wall thickness of at least one other portion of the housing such that the weight bearing portion supports the user's weight when the user places at least a portion of his or her hand on the weight bearing portion without damaging the controller to facilitate entering or exiting the wheelchair.

32. The controller of claim 31 further comprising interior ribs configured to reinforce the weight bearing portion such that the weight bearing portion supports the user's weight when the user places at least a portion of his or her hand on the weight bearing portion without damaging the controller to facilitate entering or exiting the wheelchair.

* * * * *